US00RE49842E

(19) United States
(12) Reissued Patent
Anjos

(10) Patent Number: US RE49,842 E
(45) Date of Reissued Patent: Feb. 20, 2024

(54) FLARING AND SWAGING BITS, AND METHODS USING SAME

(71) Applicant: DIVERSITECH CORPORATION, Duluth, GA (US)

(72) Inventor: Bruno Anjos, Sao Jose (BR)

(73) Assignee: DiversiTech Corporation, Duluth, GA (US)

(21) Appl. No.: 18/115,993

(22) Filed: Mar. 1, 2023

Related U.S. Patent Documents

Reissue of:
(64) Patent No.: 9,550,223
Issued: Jan. 24, 2017
Appl. No.: 14/947,537
Filed: Nov. 20, 2015

U.S. Applications:
(63) Continuation-in-part of application No. PCT/BR2013/000379, filed on Sep. 30, 2013.

(51) Int. Cl.
*B21D 39/08* (2006.01)
*B21D 19/08* (2006.01)
*B21D 41/02* (2006.01)

(52) U.S. Cl.
CPC ..... *B21D 39/08* (2013.01); *B21D 19/08* (2013.01); *B21D 41/021* (2013.01)

(58) Field of Classification Search
CPC ..... B21D 19/08; B21D 39/08; B21D 41/021
See application file for complete search history.

(56) References Cited

U.S. PATENT DOCUMENTS

| | | | | |
|---|---|---|---|---|
| 2,924,263 | A | 2/1960 | Landis | |
| 5,983,496 | A | 11/1999 | Hermanson | |
| 7,578,161 | B1 | 8/2009 | Sizemore | |
| 7,650,772 | B2 | 1/2010 | Minor | |
| 9,550,223 | B2 | 1/2017 | Anjos | |
| 2008/0006074 | A1* | 1/2008 | Gaydusek | B21D 41/021 72/393 |
| 2013/0140739 | A1 | 6/2013 | Backlund | |

FOREIGN PATENT DOCUMENTS

| | | | |
|---|---|---|---|
| BR | 8606077 | A | 6/1988 |
| BR | 9202764 | A | 3/1993 |
| CN | 201895046 | U | 7/2011 |
| CN | 202667470 | U | 1/2013 |
| FR | 1028057 | A | 5/1953 |
| FR | 2209648 | | 7/1974 |
| FR | 2000-197935 | A | 7/2000 |
| GB | 560324 | | 3/1944 |
| GB | 1204000 | A | 9/1970 |
| JP | S4915129 | U | 2/1974 |
| JP | 2005-324208 | A | 11/2005 |

OTHER PUBLICATIONS

Certified Translation of FR 1.028.027, May 19, 1953. (Year: 1953).*
(Continued)

*Primary Examiner* — William E Dondero
(74) *Attorney, Agent, or Firm* — Dentons US LLP

(57) ABSTRACT

Embodiments provide improved flaring and swaging bits, and methods for flaring and swaging.

34 Claims, 22 Drawing Sheets

(56) References Cited

OTHER PUBLICATIONS

PCT International Preliminary Report on Patentability issued for related PCT/BR2013/000379 dated Apr. 5, 2016.
PCT Written Opinion and Search Report issued for related PCT/BR2013/000379 dated Jan. 3, 2014 with English translation.
Canadian Office Action issued in related Canadian Patent Application No. 2922459 dated Feb. 16, 2021.
Canadian Office Action issued in related Canadian Patent Application No. 2922459 dated Aug. 23, 2021.
Canadian Office Action issued in related Canadian Patent Application No. 2922459 dated Mar. 3, 2022.
Mexican Office Action issued in related Mexican Patent Application No. MX/a/2016/003811 dated Sep. 24, 2021 with English translation.
Mexican Office Action issued in related Mexican Patent Application No. MX/a/2016/003811 dated Apr. 15, 2021 with English translation.
China First Office Action issued in related Chinese Patent Application No. 202010911256.3 dated Mar. 2, 2022.
China Second Office Action issued in related Chinese Patent Application No. 202010911256.3 dated Sep. 14, 2022.
EP Office Action issued in related European Patent Application No. 13894366.7 dated Aug. 9, 2017.
EP Extended Search Report issued in related European Patent Application No. 13894366.7 dated May 17, 2021.
EP Office Action issued in related European Patent Application No. 13894366.7 dated Nov. 17, 2021.
EP Office Action issued in related European Patent Application No. 13894366.7 dated Dec. 19, 2019.
EP Office Action issued in related European Patent Application No. 13894366.7 dated Oct. 12, 2020.
Petition for Inter Partes review of U.S. Pat. No. 9,550,223 Pursuant to 35 U.S.C. Section 311-319, 37 CRF section 42.
Declaration of Ian Soukup, including Curriculum Vitae.
Excerpts from new Oxford American Dictionary (1st Edition, 2015), Oxford University Press pp. 1605 and 1775.
Excerpts from Collins English dictionary (1st Edition, 2015) Harberg Collins Publishers, pp. 285-286 and 863.
Excerpts from A Dictionary of Mechanical engineering (1st Edition, 2013), Oxford Press, pp. 321 and 372.
Excerpts from Chambers Dictionary of Science and Technology (2007 Edition), Chambers Harrap publishers, Ltd., pp. 89-90 and 1064.
Excerpts from Webster's New World College Dictionary (5th Edition, 2014), Houghton, Mifflin Harcourt, NY, pp. 40 and 101.
Excerpts from The American heritage Dictionary of the English Language (5th Edition, 2011) Houghton, Mifflin, Harcourt, NY, pp. 125 and 1780.
Excerpts from Longman Dictionary of American English, (5th Edition, 2014) Pearson Education Limited, pp. 32 and 598.
Excerpts from The Cassell Dictionary of Science, (1st Edition, 1998), El Camino Collage Library, p. 220.
European Patent Office Communication of Extended European Search Report for EP 22177371.6 dated Sep. 9, 2022.

* cited by examiner

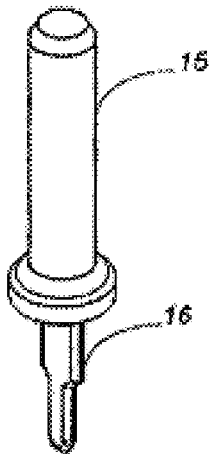
FIGURE 20
New
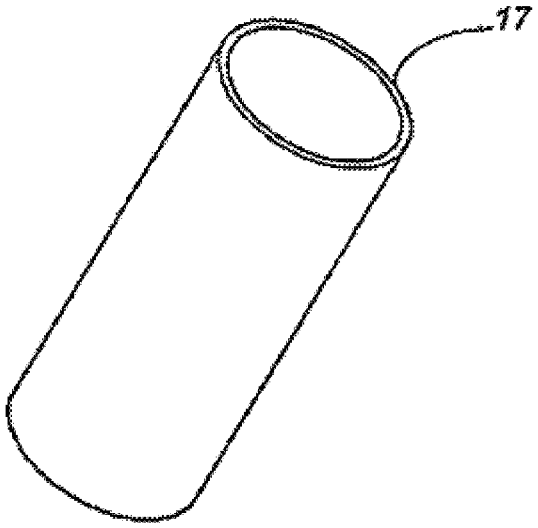
FIGURE 21
New

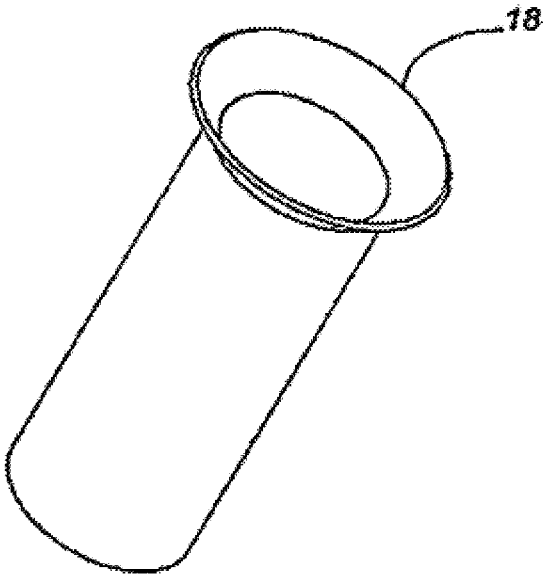
FIGURE 22
New
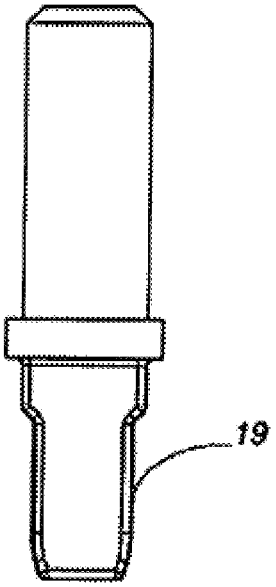
FIGURE 23
New

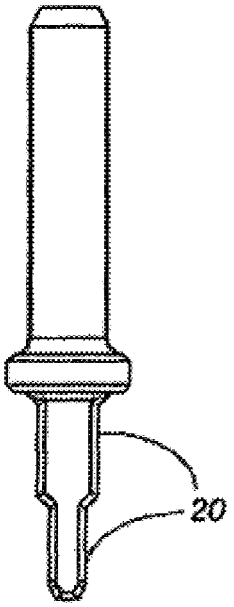
FIGURE 24
New
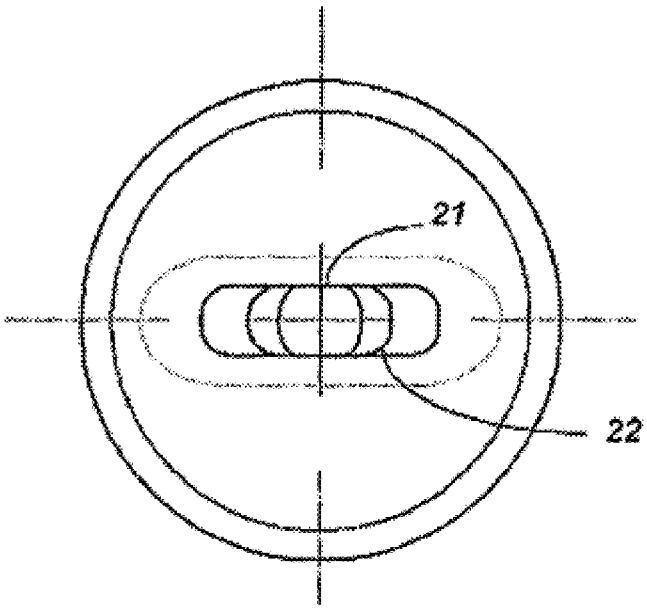
FIGURE 25
New

FLARING AND SWAGING BITS, AND METHODS USING SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

This [application] is a *reissue of U.S. Pat. No. 9,550,223, which issued from U.S. patent application Ser. No. 14/947,537, filed 20 Nov. 2015, which is a* continuation-in-part of PCT Application [Serial] No. PCT/BR2013/000379 filed 30 Sep. 2013, [and pending,] *all of* which [is] *are* hereby incorporated by reference in [its entirety] *their entireties*.

FIELD

This disclosure is related to metal fabrication tools, and more specifically is related to flaring and swaging metal fabrication tools, and methods using the same.

BACKGROUND

Fitting metal tubes together often requires manual pounding or pressing of the ends of the metal tubes, so as to modify the ends to fit together. Fitting can be a very laborious and imprecise process. A few models of tools in the market are available to perform flares and swages, the majority being concentric flaring and swaging tools and eccentric flaring tools:

BRIEF SUMMARY

Disclosed subject matter provides flaring and swaging tools that avoid or reduce risk of cracking in the wall of tube being fitted. In an embodiment, flaring and swaging tools do not create flares or swages at room temperature, and thus do not harden the flared material to an undesirable degree, in this manner do not increase the risk of cracking the wall of the tube.

Disclosed subject matter eliminates the need for using an extra clamping tool when flaring and swaging, and eliminates the labor and time for a technician to couple the tube into a clamping tool. Disclosed subject matter eliminates the performing of flaring and swaging at room temperature, and thus avoids contributing to undesirable brittleness and susceptibility or risk of the wall cracking during fitting or thereafter, such as during expansion of the tube. In an embodiment, swaging and flaring tools require reduced or minimal spaced compared to previous tools, and methods for swaging and flaring with tools as disclosed may be performed during tube installation by a technician in less space than for previous tools and methods.

Disclosed subject matter may provide a rotary insert. The rotary insert may comprise a shank portion comprising a top end, a bottom end, and a body. The insert may further comprise a stopper portion coupled to one of the top end and the bottom end of the shank portion. The stopper portion may comprise a top surface and a bottom surface. The insert may further comprise a tip comprising at least one stage portion coupled to one of the top surface and the bottom surface of the stopper portion along an axis of symmetry. The at least one stage portion may comprise rounded edges.

The disclosure may further comprise a system. The system may comprise a shank portion comprising a top end, a bottom end, and a body. The insert may further comprise a stopper portion coupled to one of the top end and the bottom end of the shank portion. The stopper portion may comprise a top surface and a bottom surface. The insert may further comprise a tip comprising at least one stage portion coupled to one of the top surface and the bottom surface of the stopper portion along an axis of symmetry. The at least one stage portion may comprise rounded edges. The system may further comprise a drill engaging at least a portion of the shank portion.

The disclosed subject matter may further provide a method for flaring a tube. The method may comprise spinning a rotary insert coupled to one of a drill or screwdriver. The insert may comprise a shank portion comprising a top end, a bottom end, and a body. The insert may further comprise a stopper portion coupled to one of the top end and the bottom end of the shank portion. The stopper portion may comprise a top surface and a bottom surface. The insert may further comprise a tip comprising at least one stage portion coupled to one of the top surface and the bottom surface of the stopper portion along an axis of symmetry. The at least one stage portion may comprise rounded edges. The tip may further comprise a flared bottom portion. The flared bottom portion may be affixed between the stopper portion and the at least one stage portion. At least two edges of the flared bottom portion may slope from the tip to the stopper portion.

In an embodiment, a method may further comprise inserting the rotary insert into an interior surface of a tube to cause friction between the tip and an interior surface of the tube, to increase the diameter of at least a portion of the tube, to create a flare, and to increase structural quality of the tube from heat provided to the tube.

The disclosure may further provide a method for swaging a tube. The method may comprise spinning a rotary insert coupled to one of a drill or screwdriver. The insert may comprise a shank portion comprising a top end, a bottom end, and a body. The insert may further comprise a stopper portion coupled to one of the top end and the bottom end of the shank portion. The stopper portion may comprise a top surface and a bottom surface. The insert may further comprise a tip comprising at least one stage portion coupled to one of the top surface and the bottom surface of the stopper portion along an axis of symmetry. The at least one stage portion may comprise rounded edges.

A method may further comprise inserting the rotary insert into an interior surface of a tube to cause friction between the tip and an interior surface of the tube, to increase the diameter of at least a portion of the tube, and to increase structural quality of the tube from heat provided to the tube.

BRIEF DESCRIPTION OF THE DRAWINGS

*FIG. 20 is a perspective view of a rotary insert embodying features disclosed herein.*

*FIG. 21 is a perspective view of an unflared and unflanged metal tube.*

*FIG. 22 is a perspective view of a the tube of FIG. 21 flared/flanged with the rotary insert of FIG. 20.*

*FIG. 23 is a side view of a rotary insert with one flanging/flaring stage.*

*FIG. 24 is a side view of a rotary insert with multiple flanging/flaring stages.*

*FIG. 25 is an end view showing edges of the flanging/flaring stages of the rotary insert of FIG. 24.*

DETAILED DESCRIPTION OF ILLUSTRATIVE IMPLEMENTATIONS

Figure 1:
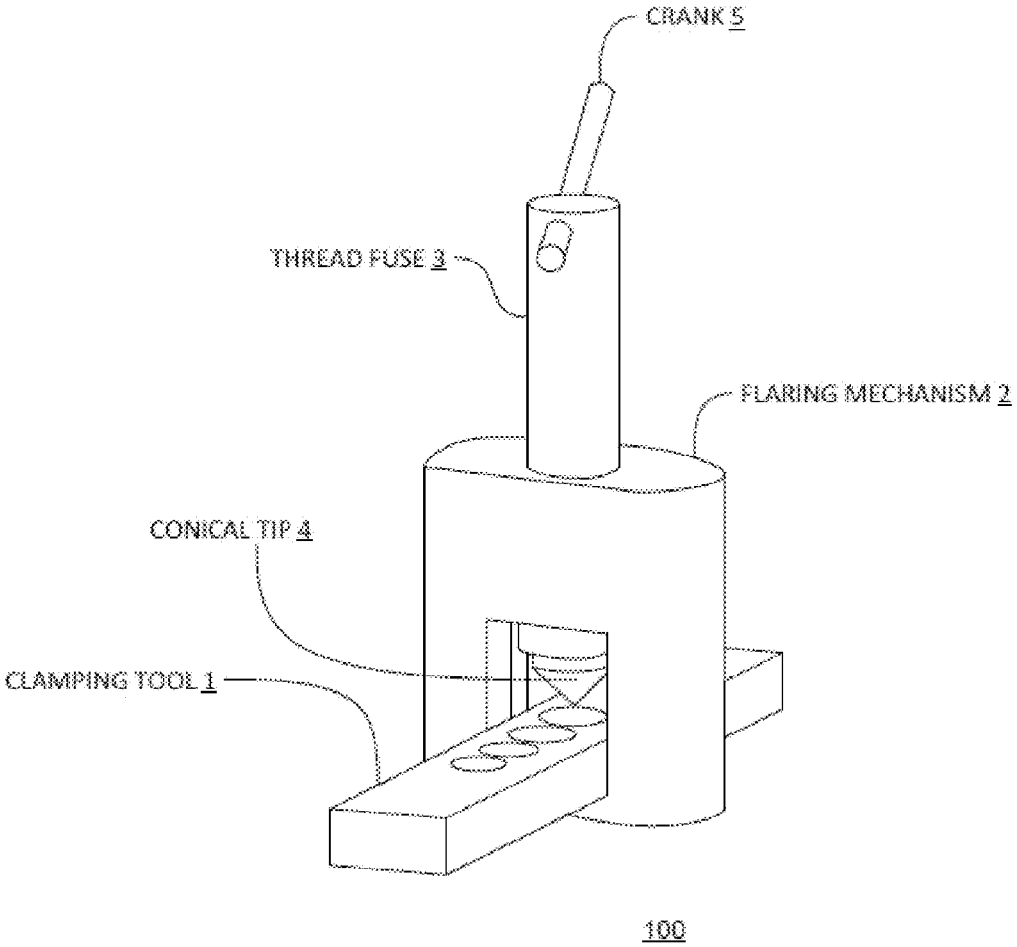
FIG. 1 PRIOR ART
FIG. 1 presents an isometric diagram of a concentric flaring tool, according to an implementation.

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The present disclosure describes a metallic insert which, in some implementations, can be coupled into a rotary actuated mechanism, to flare or swage metallic tube ends. The actuation of the insert, in some implementations, can be performed by "drills" or "screwdrivers" and, as a final result, the insert is capable of creating flares and swages in metallic tubes, especially tubes applied to "split" air conditioning connection systems, refrigeration connection systems, and transportation of liquefied petroleum gas and any other similar tube, being much quicker and more resistant to cracks than conventional technology, due to the heat created by the friction of the insert spinning inside the metallic tube.

In embodiments, the insert may provide, to a tube, a flared opening at at least one of the tube's ends, such as, but not limited to, a 45 degree angle.

In embodiments, the insert may provide, to a tube, a swaged opening at at least one of the tube's ends, which may allow for the coupling of another tube with the same, or a larger, diameter.

In embodiments, the insert may provide, to a tube, a swaging opening with a flared opening, which may allow for the coupling of another tube with the same, or a larger, diameter.

Many industrial segments, especially the Heating, Ventilation and Air Conditioning (HVAC) industry, demand tools and equipment to simplify their day to day work, in order to optimize and reduce the production and work times. For example, there is a need to swage and flare metallic tubes of heat exchangers, such as copper tubes and aluminum tubes, to both manufacture condensating and evaporating units for residential, commercial, and industrial applications.

It will be understood that, as used herein, "tube" may include pipe or piping having a round, tubular cross section.

FIG. 1 presents an isometric view of a concentric flaring or swaging tool 100, according to an implementation. The concentric flaring or swaging tools are characterized by possessing a clamping tool 1, to affix the tube, and a flaring or swaging mechanism 2. The flaring or swaging mechanism 2 is compound by a fixing body, to attach the flaring or swaging mechanism 2 into the clamping tool 1, and a thread fuse 3, which at one end has a crank 5 and the other end has a conical tip, 4 that can be extended into a longer tip for swaging, with a 45 degree angle, to be performed at room temperature.

Figure 2:
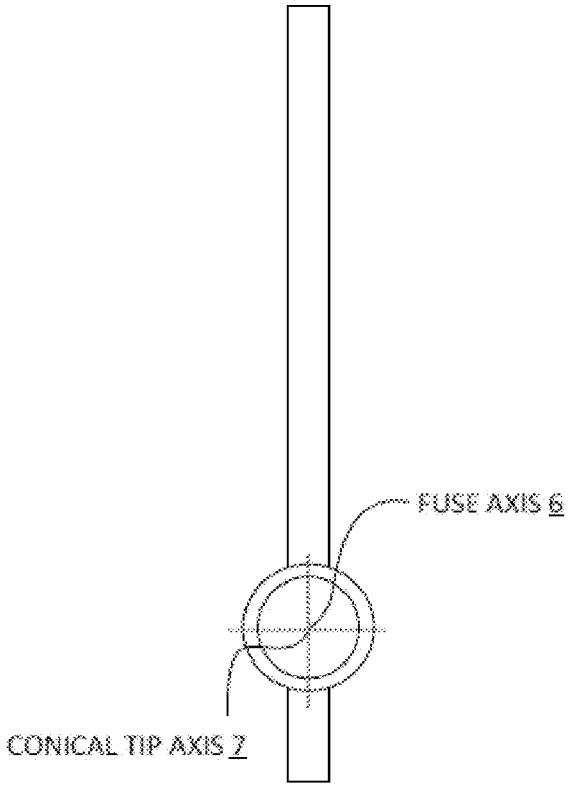
FIG. 2 PRIOR ART
FIG. 2 presents a bottom view of the alignment between the fuse axis and conical tip axis of the isometric flaring tool, according to an implementation.

FIG. 2 presents a bottom view of the alignment between the fuse axis and conical tip axis of the flaring or swaging tool 100, according to an implementation. The coupling between the flaring or swaging mechanism 2 and the thread fuse 3 is characterized by the concentric alignment between the fuse axis 6 and the conical tip axis 7. During the execution of flare, the contact zone between the conical tip and the tube is given through the whole surface of the cone, at room temperature.

Figure 3:
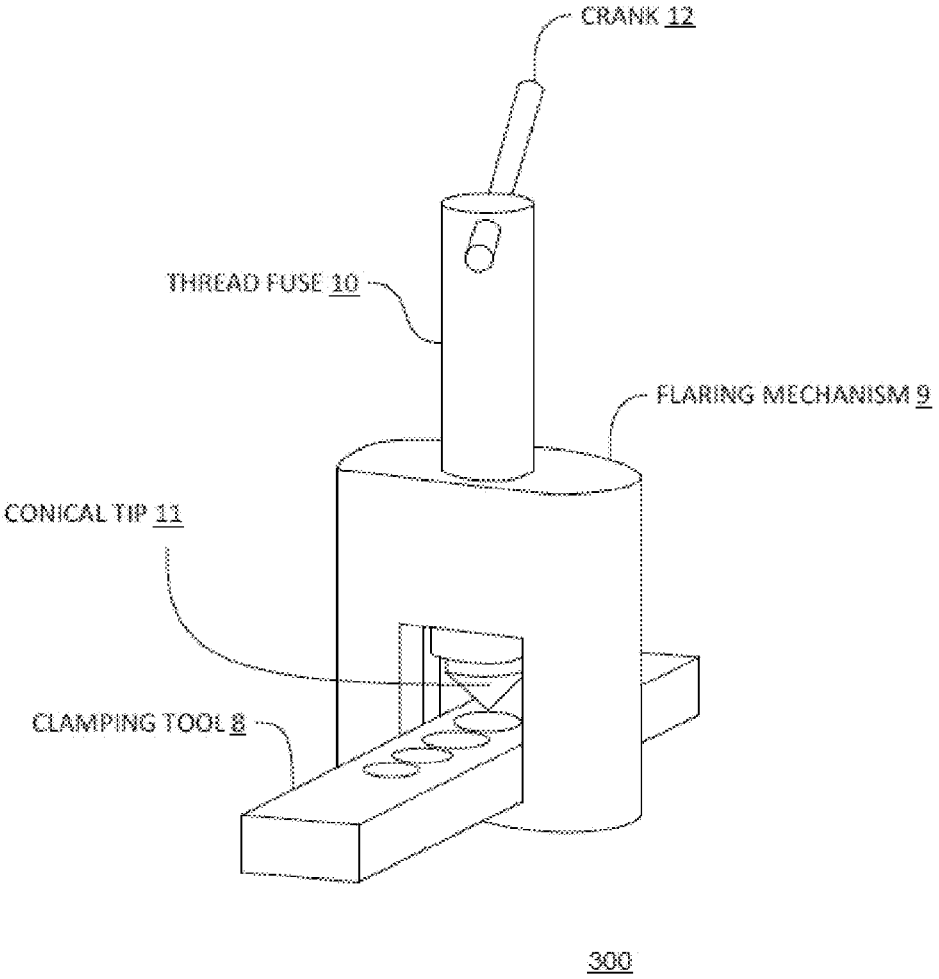
FIG. 3 PRIOR ART
FIG. 3 presents an isometric diagram of an eccentric flaring tool, according to an implementation.

FIG. 3 presents an isometric view of an eccentric flaring tool 300, according to an implementation. The eccentric flaring tools are characterized by possessing a clamping tool 8, to affix the tube, and a flaring mechanism 9. The flaring mechanism 9 is compound by a fixing body, to attach the flaring mechanism 9 into the clamping tool 8, and a thread fuse 10, which at one end has a crank 12 and the other end has a conical tip 11, with a 45 degree angle to be performed at room temperature.

Figure 4:
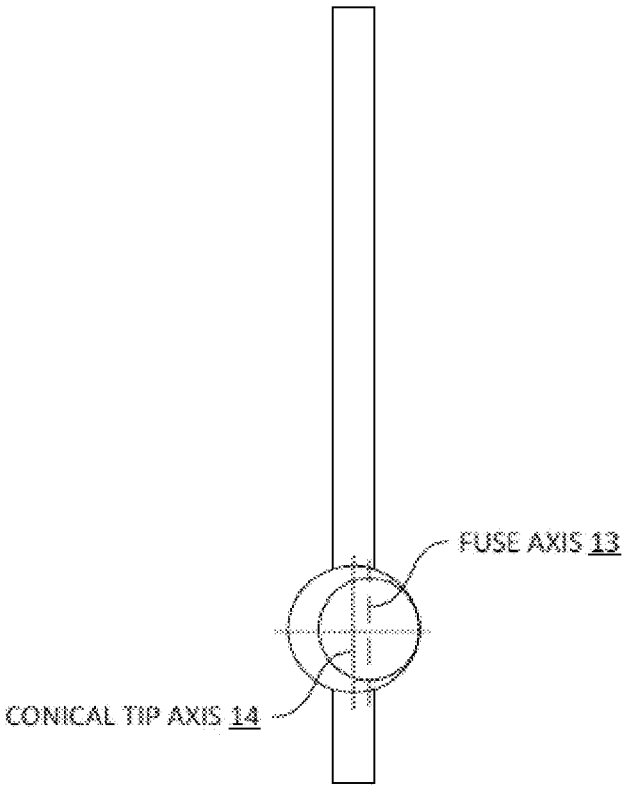
FIG. 4 PRIOR ART
FIG. 4 presents a bottom view of the alignment between the fuse axis and conical tip axis of the eccentric flaring tool, according to an implementation.

FIG. 4 presents a bottom view of the alignment between the fuse axis and conical tip axis of the eccentric flaring tool 300, according to an implementation. The coupling between the flaring mechanism 9 and the thread fuse 10 is characterized by the eccentric alignment between the fuse axis 13 and the conical tip axis 14. During the execution of flare, the contact zone between the conical tip and the tube is given through a linear contact with the cone, at room temperature.

Conventionally, there are many mechanisms to obtain a swaged or flared tube.

In embodiments, the bits may provide the ability to be coupled to a number of drills or screwdrivers.

In embodiments, a single flaring bit may provide the ability to create multiple flares in metallic tubes with different diameters without needing to use one or more other bits.

In embodiment, the bits do not need to be utilized with any clamping tools or holders during or after operation.

In embodiments, the bits may be utilized to perform a flare or swage at a hot temperature in order to avoid material hardening and, subsequently, cracking.

In embodiments, the bits may comprise a homogeneous and resistant microstructure due to the high temperature at which the bits may be formed.

During an air conditioning installation, especially the split types of air conditioners, at least four flaring are necessary for the installation. The split type air conditioners comprise two units: an indoor unit and an outdoor unit. To connect the outdoor unit and the indoor unit and make the two air conditioner units work together, the use of copper or aluminum tubes is required. Each tube has a different diameter, varying according to the refrigeration capacity of the equipment. As an example, for R-22 air conditioners, 7,000 BTUs/hour and 9,000 BTUs/hour equipment generally requires one ¼" tube and one ⅜" tube, while 12,000 BTUs/hour and 18,000 BTUs/hour equipment generally requires one ½" tube and one ¼" tube.

In embodiments, the rotary inserts 600, 700, 1000, 1100, 1200 in FIGS. 6, 7, 10, 11, and 12 speed up the flaring and swaging processes, by coupling two or more flaring or swaging stages of different diameters into one tool, creating a multiple-stage insert, which means that during installation procedures of equipment, the technician may only need to insert one insert into the drill or screwdriver and perform the four flares/swages for a specific job. Rotary insert 600 may comprise two-stage flaring bit 620. Rotary insert 700 may comprise two-stage flaring tip 720. Rotary insert 1000 and 1100 may comprise two-stage swaging tip 1020. Rotary insert 1200 may comprise two-stage swaging tip 1220. In embodiments, rotary inserts 600, 700, 1000, 1100, and 1200 comprise shank portion 40. In embodiments, rotary inserts 600, 700, 1000, 1100, and 1200 comprise stopper portion 50.

In embodiments, the rotary insert 500, 600, 700 for the flaring of metallic tubes (FIGS. 5, 6, and 7) may perform flares into metallic tubes through the flaring tip's multiple diameter stages and interchangeable system. The inserts, in some implementations, can be coupled into drills (whether the inserts are with a mechanical mandrel or pneumatic mandrel), screwdrivers, etc. Rotary insert 500 comprises a single-stage flaring tip 520 that may be used to flare metallic tubes. Rotary insert 500 further comprises flared bottom portion 530 that may provide a flare to a metallic tube. Rotary insert 500 comprises a stopper portion 50 found between the flared bottom portion 530 and the single-stage flaring tip 520.

Figure 5:
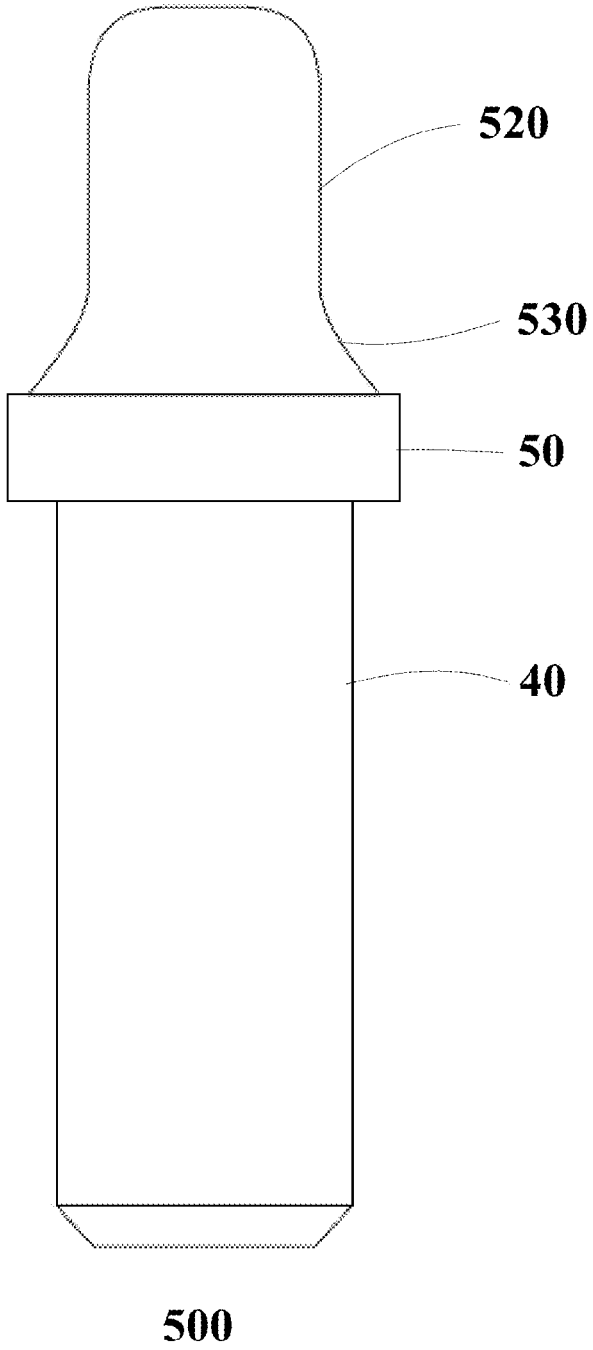
FIG. 5 presents a front view of a one-stage flaring tip, according to an implementation.

FIG. 5 presents a front view of a one-stage flaring tip 500, according to an implementation. The flared bottom portion 530 of the head of the flaring tip 500 may allow the head to flare a portion of a tube when the tip is inserted into a tube.

Figure 6:
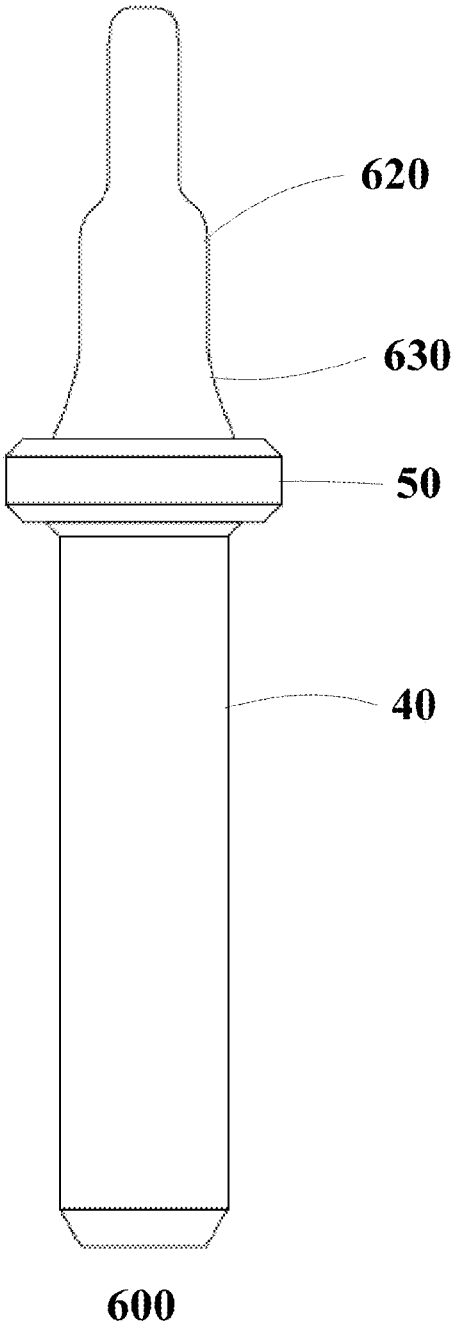
FIG. 6 presents a front view of a two-stage flaring tip, according to an implementation.
Figure 7:
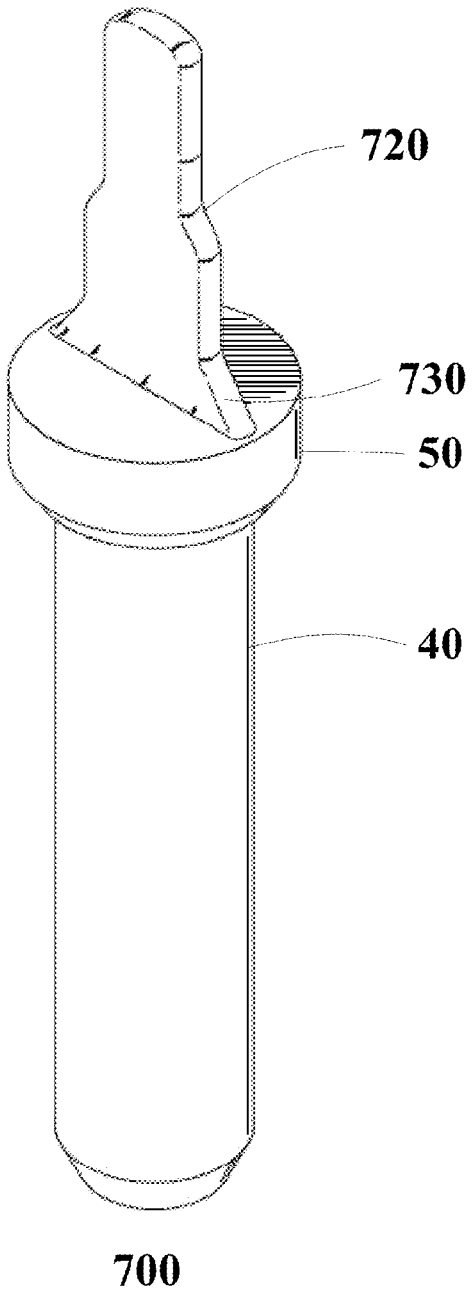
FIG. 7 presents an isometric view of a two-stage flaring tip, according to an implementation.

FIGS. 6 and 7 present front and isometric views of rotary inserts 600 and 700 according to an implementation. The inserts 600,700 comprise shank portions 40 that may be inserted into the mandrel or chuck of a screwdriver or drill. The inserts 600,700 further comprise two-stage flaring tips 620,720 comprising two stages of different diameters and a flared bottom portion 630, which may fit into the inner diameter of a metallic tube to create a flared end that may properly fit onto the outer diameter of another metallic tube. The inserts 600,700 further include stopper portions 50 located between the shank portions 40 and the flared bottom portions 630,730 that may allow the user to more easily flare a tube of the appropriate length. In embodiments, the inserts may comprise, but are not limited to having, a cylindrical, hexagonal, or square shank portion 630,730 with 8 mm of diameter, which may couple with a drill or screwdriver through their mandrels or chuck. The flared bottom portion 630 of rotary insert 600 may create a flare that has a smaller opening angle that that of an opening angle of a flare that had been flared by the flared bottom portion 730 of rotary insert 700.

Figure 8:
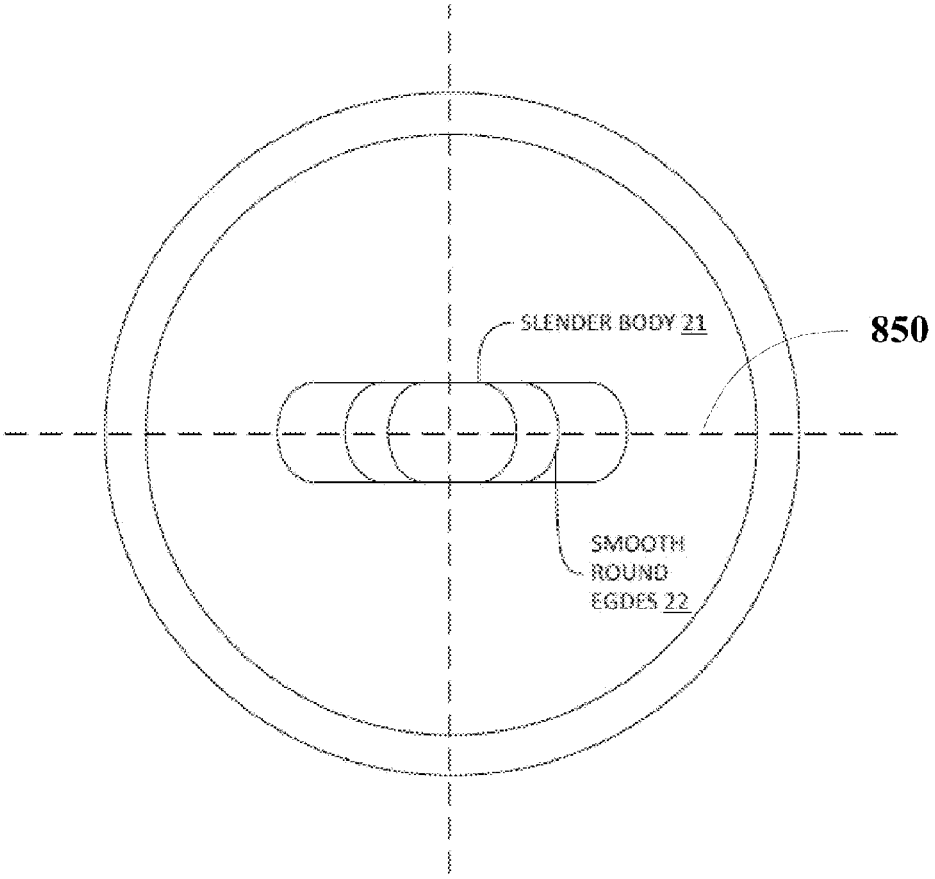
FIG. 8 presents a top view of a contact surface between a flaring tip and the metallic tube, according to an implementation.

FIG. 8 presents a top profile view of the two-stage flaring tip 620 of rotary insert 600 according to an implementation. The flaring tip 620 comprises a slender body 21 and smooth rounded edges 22, which may diminish the contact surface between the two-stage flaring tip 620 and the metallic tube. In embodiments, the slender body 21 and smooth rounded edges 22 may decrease heat and burr formation that may develop at the front of the flaring tip 620 during traditional flares. Stopper portion 50 may be found circumnavigating the two-stage flaring tip 620. FIG. 8 further displays an axis of symmetry 850. The length of the flaring tip 620 may run along the axis of symmetry 850.

Figure 9:
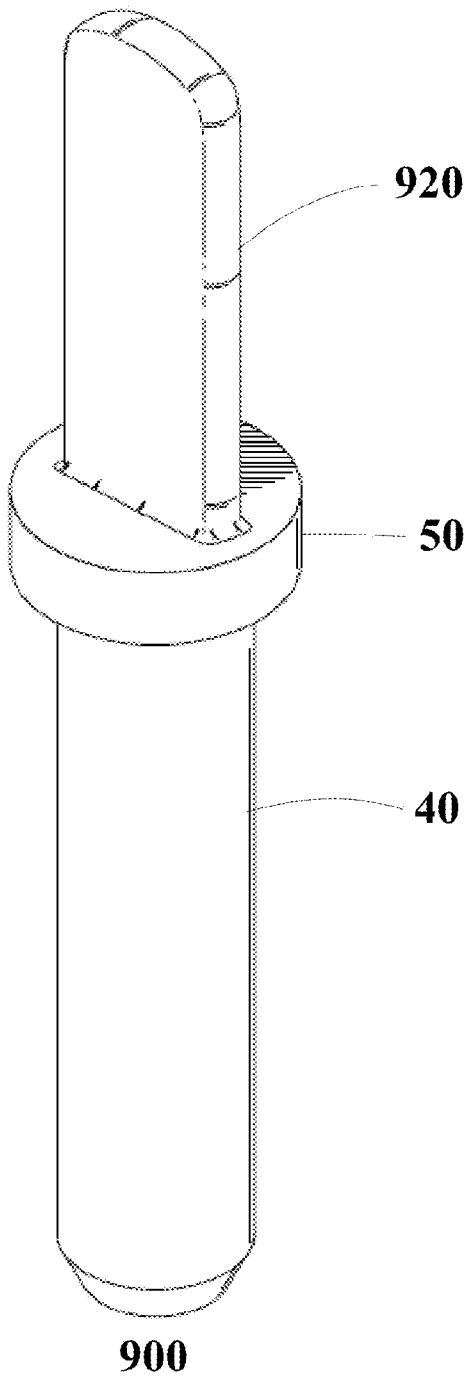
FIG. 9 presents an isometric view of a one-stage swaging tip, according to an implementation.

FIG. 9 presents an isometric view of a rotary insert 900 according to an implementation. In embodiments, the insert 900 comprises a one-stage swaging tip 920, which may fit into the inner diameter of a metallic tube to create a widened end to properly fit onto the outer diameter of another metallic tube. Stopper portion 50 may be found below swaging tip 920. Shank portion 40 may be found below stopper portion 50.

Figure 10:
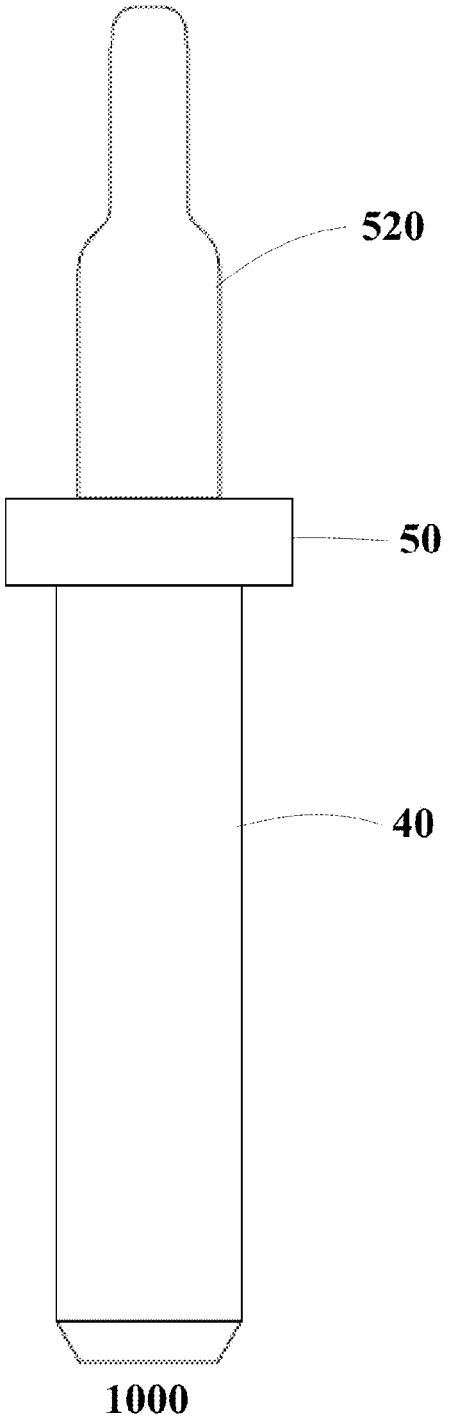
FIG. 10 presents a front view of a two-stage swaging tip, according to an implementation.

FIG. 10 presents a front view of a rotary insert 1000 according to an implementation. In embodiments, the insert includes a swaging tip 1020 comprising two stages, which means that it comprises a least two different diameters in a single tool, which may fit into the inner diameter of a metallic tube to create a widened end to properly fit onto the outer diameter of another metallic tube. Stopper portion 50 may be found below swaging tip 1020. Shank portion 40 may be found below stopper portion 50.

Figure 11:
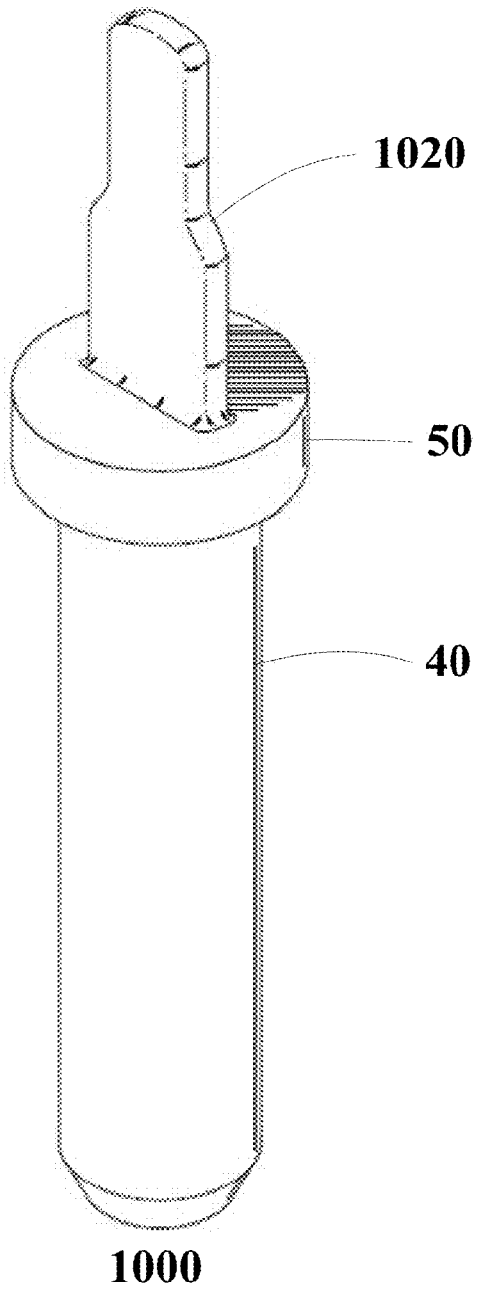
FIG. 11 presents an isometric view of a two-stage swaging tip, according to an implementation.
Figure 12:
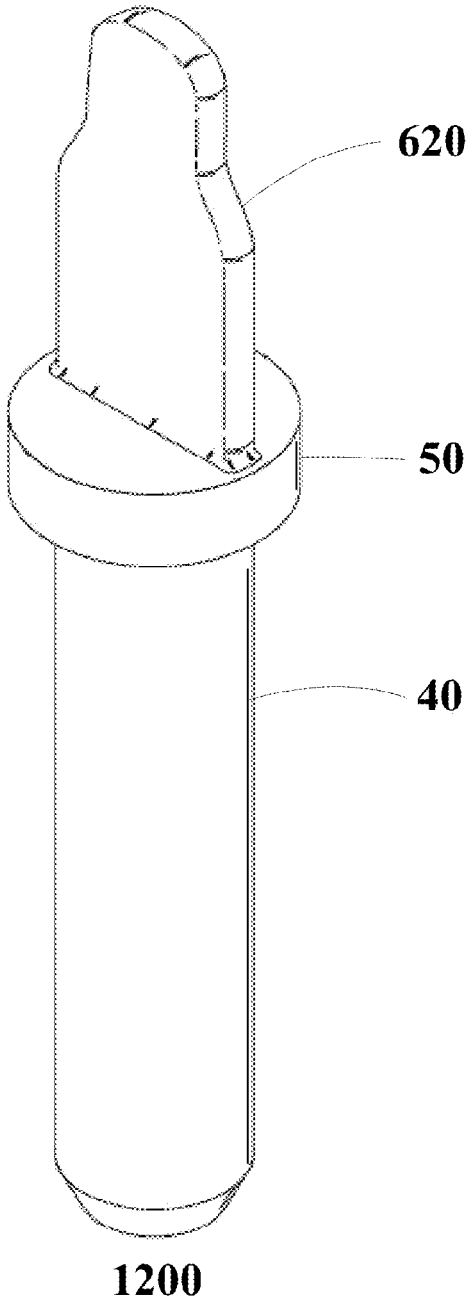
FIG. 12 presents an isometric view of a two-stage swaging tip, according to an implementation.

FIGS. 11 and 12 present isometric views of rotary insert 1000 and rotary insert 1200 according to an implementation. In an embodiment, the rotary insert 1000 and 1200 each comprise a swaging tip containing two stages 1020, 1220, which means, they have at least two different diameters in one single tool, which may fit into the inner diameter of a metallic tube to create a widened end to properly fit onto the outer diameter of another metallic tube. In embodiments, rotary insert 1200 may be utilized in a tube with a larger diameter that may not allow for swaging from rotary insert 1000. In embodiments, rotary insert 1200 may provide a larger swage to a tube than rotary insert 1000. Stopper portions 50 may be found below swaging tips 1020 and 1220. Shank portions 40 may be found below stopper portions 50.

Figure 13:
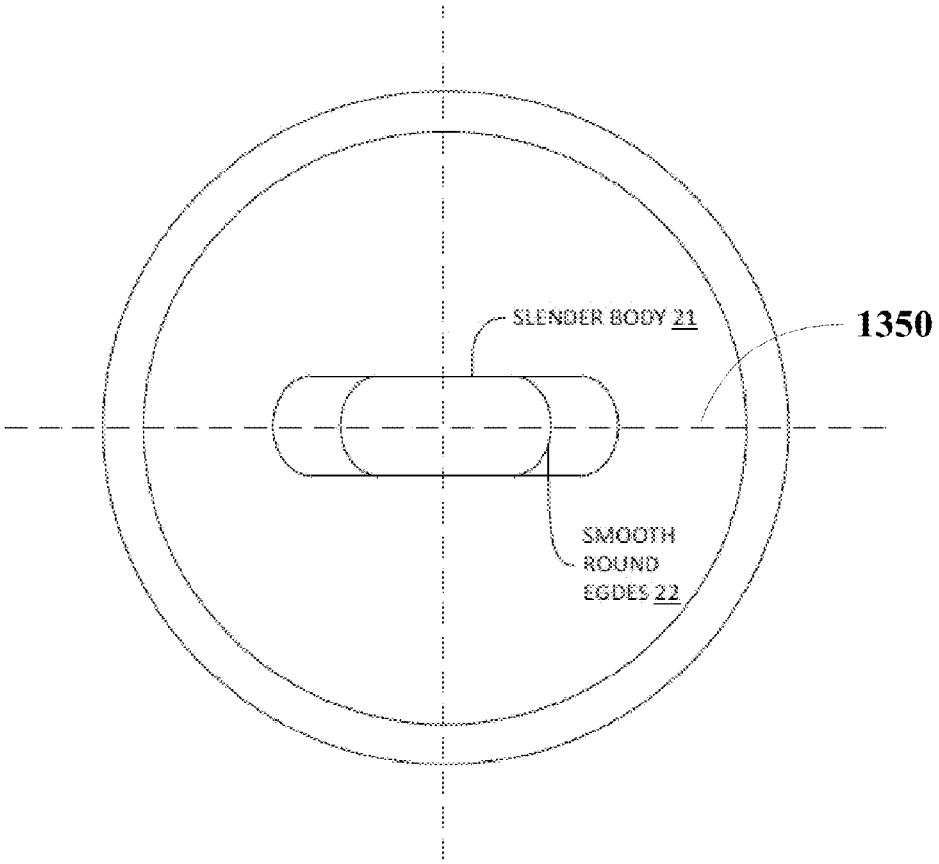
FIG. 13 presents a top view of a contact surface between a flaring tip and the metallic tube, according to an implementation.

FIG. 13 presents a top profile view of a two-stage swaging tip 1020 according to an implementation. The swaging tip 1020 has a slender body 21 and smooth rounded edges 22, which may diminish the contact surface between the two-stage swaging tip 1020 and the metallic tube. In embodiments, the slender body 21 and smooth rounded edges 22 may decrease heat and burr formation that may develop at the front of the swaging tip 1020 during the swage. Stopper portion 50 may be found circumnavigating the two-stage swaging tip 1020. FIG. 13 further displays an axis of symmetry 1350. The length of the swaging tip 1320 may run along the axis of symmetry 1350.

Figure 14:
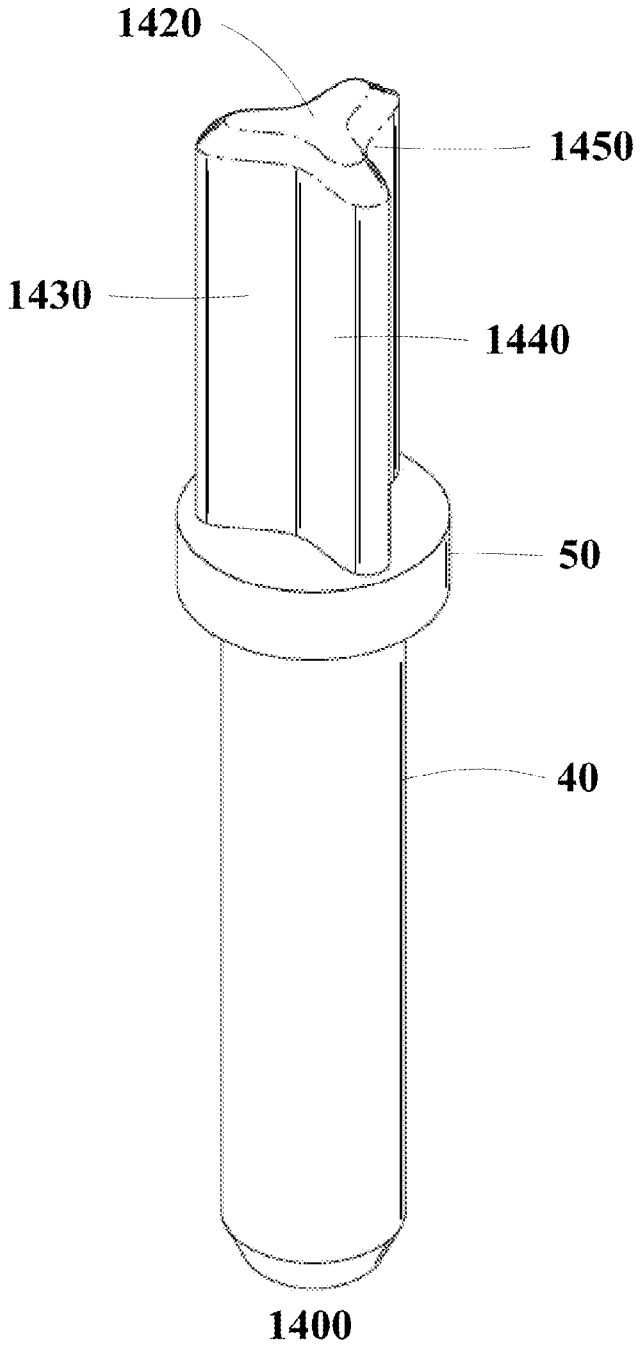
FIG. 14 presents an isometric view of a one-stage swaging tip with three swaging lobes, according to an implementation.

FIG. 14 presents an isometric view of a rotary insert 1400 according to an implementation. In an embodiment, the insert 1400 may include a one-stage swaging tip 1420 with three swaging lobes 1430, 1440, 1450, which may fit into the inner diameter of a metallic tube to create a widened end to properly fit onto the outer diameter of another metallic tube. In embodiments, the lobes may comprise an equal angle between them in order to enhance stability while swaging. In embodiments, the three swaging lobes may comprise flared bottom portions, thus making the one-stage swaging tip 1420 a one-stage flaring tip. In embodiments, the one-stage swaging tip 1420 may comprise two stages, thus making the one-stage swaging tip 1420 a two-stage swaging tip. Stopper portion 50 may be found below swaging tip 1420. Shank portion 40 may be found below stopper portion 50.

Figure 15:
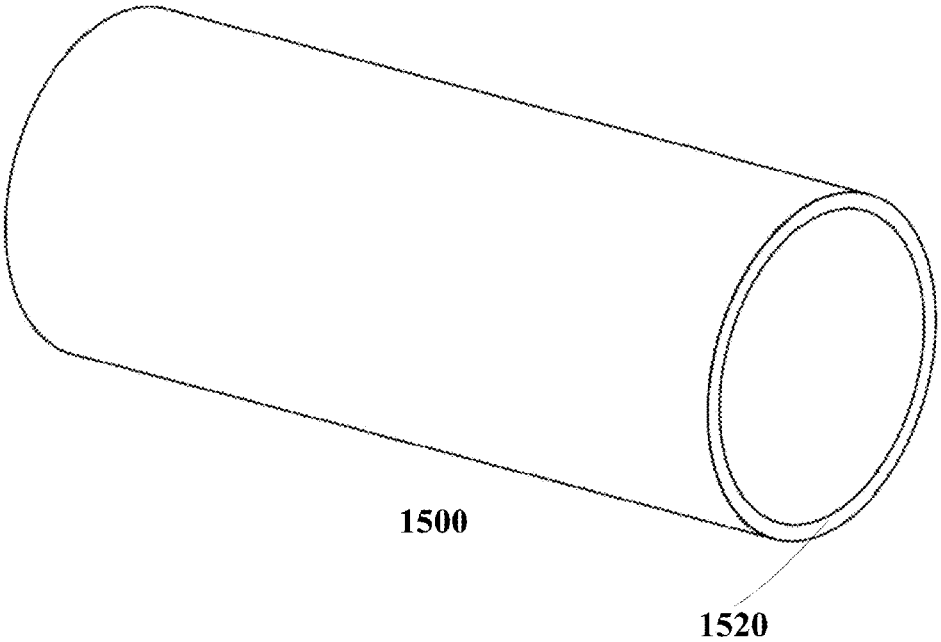
FIG. 15 presents an isometric view of a tube end before being flared or swaged, according to an implementation.

FIG. 15 presents an isometric view of a tube 1500, which a flaring tip or swaging tip may be inserted into, according to an implementation. The metallic tube end 1520 at this stage has not been flared or swaged by a flaring tip or a swaging tip.

Figure 16:
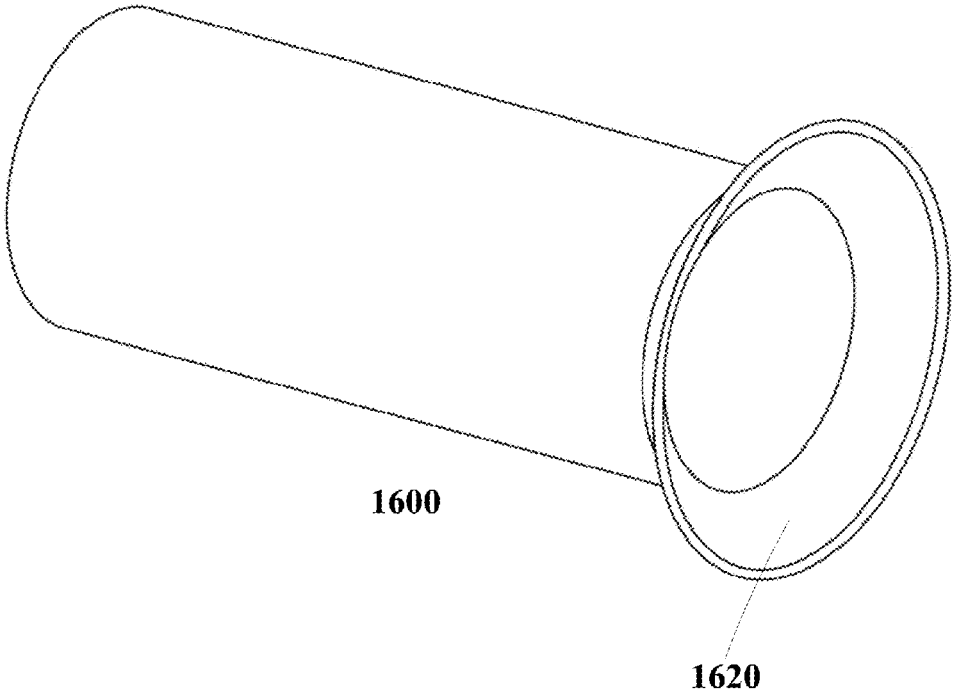
FIG. 16 presents an isometric view of a flared end of a tube, according to an implementation.

FIG. 16 presents an isometric view of a tube 1600 that has been flared by a flaring tip, such as, but not limited to flaring tip 500, according to an implementation. FIG. 16 shows the flare shape 1620 created by a flaring tip. In embodiments, the flare shape 1620 may comprise an angle ranging between 30° and 60°.

Figure 17:
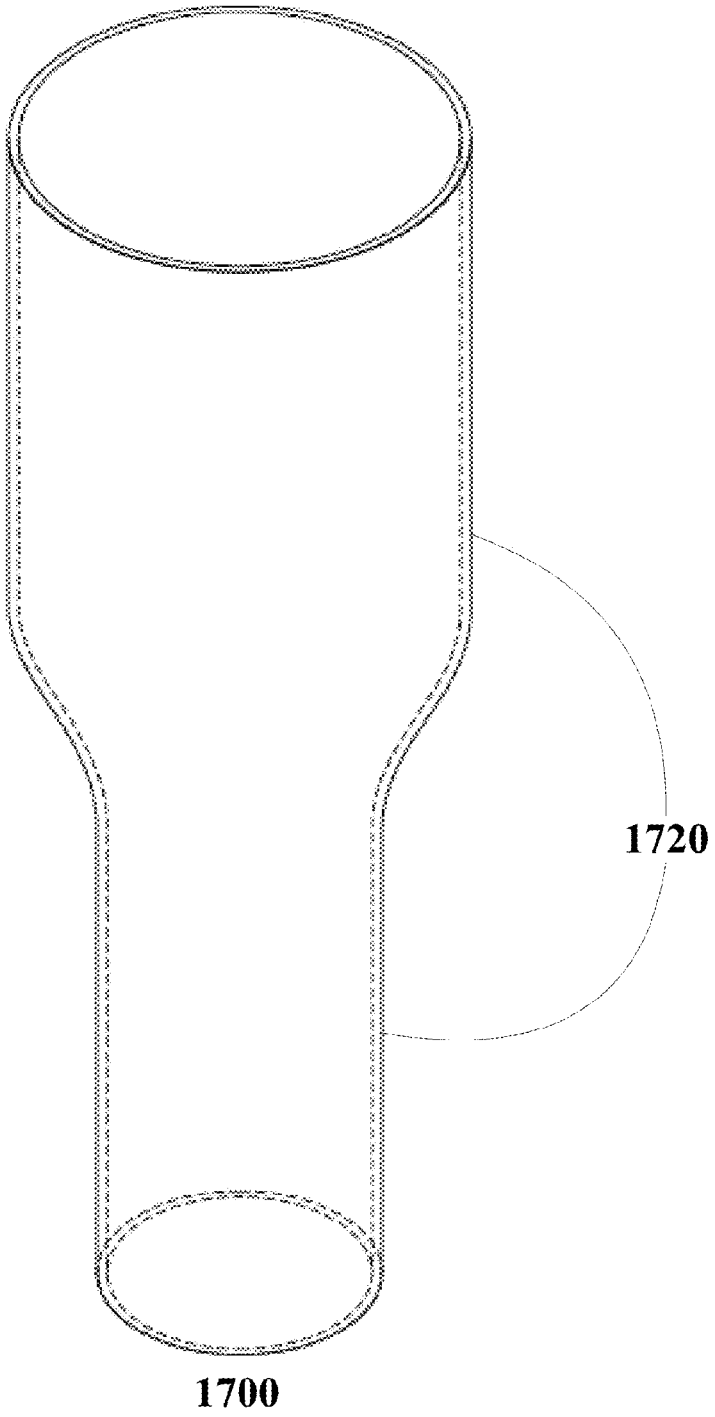
FIG. 17 presents an isometric view of a tube that has been swaged by a two-stage swaging tip, according to an implementation.

FIG. 17 presents an isometric view of a tube 1700 that has been swaged by a two-stage swaging tip such as, but not limited to two-stage swaging tip 1100 and 1200, according to an implementation. FIG. 17 shows the double swaged shape 1720 created by a swaging tip.

In embodiments, the bits may be composed of separate parts that may be connected by any connection method, including but not limited to, screwing, gluing, welding, etc.

Whenever a metallic tube is cut, the cutting may create sharp inner edges around the perimeter of the metallic tube due to material deformation and design of the cutting tool. In embodiments, the swaging and flaring tips design may allow for the removal of sharp edges from the tube and may not permit the tube to crack easily.

In embodiments, the tips may not require any clamping or holding tool to perform a flare or swage in a metallic tube because the strength required to keep the metallic tube in position is low so a user can keep the tubes in the right position using his hands. The friction and ensuing heat generation (from the rotation of the tips) facilitate the shape formation of the flare or swage, which may increase malleability in the flared or swaged tip of the metallic tube. The lack of hardening in the flared or swaged tip may prevent cracking at the flared or swaged tube end during the assembling of a metallic tube with a valve using a connection nut, which is a recurring problem during any air conditioning installation.

Figure 18:
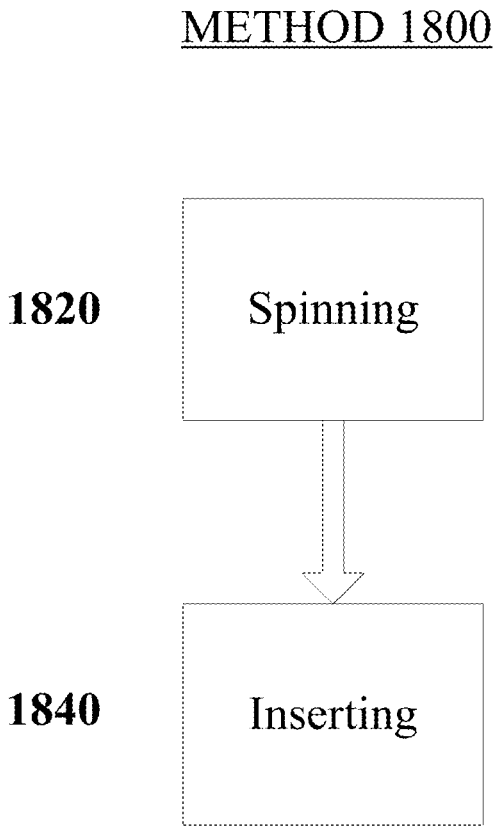
FIG. 18 presents a method for flaring a tube in accordance with embodiments.

FIG. 18 displays a method 1800 for flaring a tube. The method 1800 may comprise spinning 1820 a rotary insert coupled to one of a drill or screwdriver. The insert may comprise a shank portion comprising a top end, a bottom end, and a body. The insert may further comprise a stopper portion coupled to one of the top end and the bottom end of the shank portion. The stopper portion may comprise a top surface and a bottom surface. The insert may further comprise a tip comprising at least one stage portion coupled to one of the top surface and the bottom surface of the stopper portion along an axis of symmetry. The at least one stage portion may comprise rounded edges. The tip may further comprise a flared bottom portion. The flared bottom portion may be affixed between the stopper portion and the at least one stage portion. At least two edges of the flared bottom portion may slope from the tip to the stopper portion.

The method 1800 may further comprise inserting 1840 the rotary insert into an interior surface of a tube to cause friction between the tip and an interior surface of the tube, to increase the diameter of at least a portion of the tube, to create a flare, and to increase structural quality of the tube from heat provided to the tube.

Figure 19:
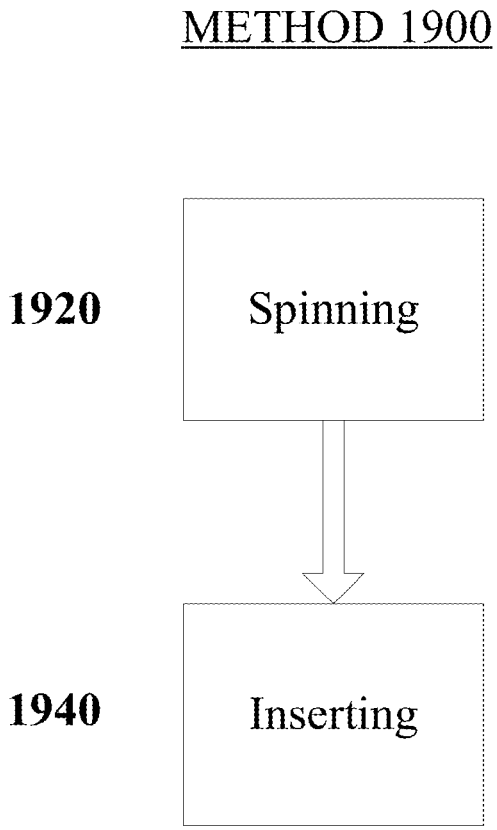
FIG. 19 presents a method for swaging a tube in accordance with embodiments.

FIG. 19 displays a method 1900 for swaging a tube. The method 1900 may comprise spinning 1920 a rotary insert coupled to one of a drill or screwdriver. The insert may comprise a shank portion comprising a top end, a bottom end, and a body. The insert may further comprise a stopper portion coupled to one of the top end and the bottom end of the shank portion. The stopper portion may comprise a top surface and a bottom surface. The insert may further comprise a tip comprising at least one stage portion coupled to one of the top surface and the bottom surface of the stopper portion along an axis of symmetry. The at least one stage portion may comprise rounded edges.

The method 1900 may further comprise inserting 1940 the rotary insert into an interior surface of a tube to cause friction between the tip and an interior surface of the tube, to increase the diameter of at least a portion of the tube, and to increase structural quality of the tube from heat provided to the tube.

In embodiments, the flaring or swaging tips may be handled more easily than traditional flaring or swaging tools. In embodiments, the flaring or swaging tips may save a technician time when completing a job.

In embodiments, a rotary insert may be provided. The rotary insert may comprise a shank portion comprising a top end, a bottom end, and a body. The insert may further comprise a stopper portion coupled to one of the top end and the bottom end of the shank portion. The stopper portion may comprise a top surface and a bottom surface. The insert may further comprise a tip comprising at least one stage portion coupled to one of the top surface and the bottom surface of the stopper portion along an axis of symmetry (such as that in FIG. 8 and FIG. 13). The at least one stage portion may comprise rounded edges.

In embodiments, a system may be provided. The system may comprise a shank portion comprising a top end, a bottom end, and a body. The insert may further comprise a stopper portion coupled to one of the top end and the bottom end of the shank portion. The stopper portion may comprise a top surface and a bottom surface. The insert may further comprise a tip comprising at least one stage portion coupled to one of the top surface and the bottom surface of the stopper portion along an axis of symmetry (such as that in FIG. 8 and FIG. 13). The at least one stage portion may comprise rounded edges. The system may further comprise a drill engaging at least a portion of the shank portion.

In embodiments, each of the at least one stage portion may be different in diameter than each of the other at least one stage portion.

In embodiments, the insert may be formed as a single element. In embodiments, the single element insert may be formed using a mold.

In embodiments, the insert may be formed from more than one element. For example, the shank portion, the stopper portion, and the tip may be single elements that may be affixed to one another. In embodiments, the separate elements may be welded together.

In embodiments, the insert may comprise metal. In embodiments, the insert may comprise ceramic.

In embodiments, the tip may further comprise a flared bottom portion. The flared bottom may be affixed between the stopper portion and the at least one stage portion. At least two edges of the flared bottom portion may slope from the tip to the stopper portion.

In embodiments, the rounded edges may be equal in diameter.

In embodiments, the insert may comprise one stage portion. In embodiments, the insert may comprise two stage portions.

For the purposes of this disclosure, the term "insert" may refer to the end of a bit that may be inserted and secured within a drill or screwdriver.

For the purposes of this disclosure, the terms "tube" and "pipe" may be synonymous.

In embodiments, a flaring or swaging bit may comprise more than two stages.

In embodiments, any of the embodiments of a rotary insert may comprise a shank portion 40. The shank portion 40 may be configured to fit within a mandrel, such as, but not limited to, a mandrel in a screwdriver or a drill.

In embodiments, any of the embodiments of a rotary insert may comprise a stopper portion 50. The stopper portion 50 may be found between a swaging tip and a shank portion 40 or (if a flaring bit) between a flared bottom and a shank portion 40. The stopper portion 50 may prevent a flaring or swaging bit from being inserted more than a certain length into a metallic tube.

In embodiments, the stopper portion 50 may comprise a single stage, such as that in FIG. 10. In embodiments, the stopper portion 50 may comprise multiple stages, such as that in FIG. 6.

In embodiments, the stopper portion 50 may be a shape other than that of a cylinder such as, but not limited to a rectangular prism, a hexagonal prism, and an octagonal prism.

In embodiments, inserts may be formed as a single element.

In embodiments, inserts may be formed from more than one element.

In embodiments, tubes to be flared or swaged may comprise polymer.

In embodiments, tubes to be flared or swaged may comprise wood.

For the purposes of this disclosure, the terms "stage" and "stage portion" may be synonymous.

In embodiments, the disclosure may provide optimization of the flaring or swaging process and optimization of time for altering metallic tubes for air conditioning installations, altering tubes for refrigeration applications, altering tubes for liquefied petroleum gas systems, or any similar flared or swaged connections. In embodiments, the flaring and swaging bits may improve the final quality of a flare or swage by adding heat through constant friction to a flared or swaged area, which may create a stronger micro structure.

Although specific embodiments are illustrated and described herein, it will be appreciated by those of ordinary skill in the art that any arrangement which is calculated to achieve the same purpose can be substituted for the specific embodiments shown. This application is intended to cover any adaptations or variations of the embodiments and disclosure. For example, although described in terminology and terms common to the field referenced hereinabove, one of ordinary skill in the art will appreciate that implementations can be made for other systems, apparatus or methods that provide the required function. In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, apparatus and processes. Terminology used in the present disclosure is intended to include all environments and alternate technologies which provide the same functionality described herein.

*Inserted herein is text from certified English language translation of the Specification of PCT Application No. PCT/BR2013/00379, filed 30 Sep. 2013 (published as WO 2015/042674 on 2 Apr. 2015), which was incorporated by reference in U.S. patent application Ser. No. 14/947,537, as noted above. References to the FIGS. 5-10 have been amended to refer to FIGS. 20-25.*

*The present invention refers to a metal insert that must be coupled to a rotary drive mechanism, for flanging/widening the ends of metal tubes. The insert drive can be made by using "drills" or "screwdrivers" and, as a final result, it is capable of making flanges in specially applied metal tubes, and "split" type air conditioning system connections, refrigeration systems connections and liquefied petroleum gas transport systems connections and similar, being faster than the current state of the art, due to the heating generated by the rotation of the insert inside the metal tube.*

*Therefore, the insert is intended to form:*

*1) a flange opening at the tube ends at an angle of 45°, or;*

*2) widening of the metal tube for coupling with a tube of the same gauge, or*

*3) widening with the flange opening, for coupling of another metal tube of the same diameter.*

*The industrial sectors, notably the industry and commerce of refrigeration, demand equipment that simplifies, optimizes and reduces production and labor time. As an example, the need for widening and shaping flange in metal tubes of heat exchangers, such as copper tubes and aluminum tubes, for the manufacture of condensing and evaporation units, in home applications, commercial and industrial lines can be highlighted.*

*The present patent application is directly related to patent PI0902047-0 A2, which clearly denotes the characteristics of the connection where flanged tubes are applied. However, it differs in that it refers to the method of obtaining the shape of the flanged tube or, as denoted in patent PI0902047-0 A2 cited above, "angled tube."*

*Currently, there are several mechanisms of obtaining a flanged tube. However, they are differentials of the object of the present invention:*

*1) the operating tool design;*

*2) application mode, which can be performed using a "drill" or "screwdriver";*

*3) ability to make, with the same insert, multiple flanges in tubes of different gauges, due to the different diameters in a single insert;*

*4) it does not require a tailstock system, "mordant," to fix the metal pipe to be flanged;*

*5) the hot formation of the flange, in order to avoid the hardening of the flanged material; and*

*6) the characteristic of the final flange obtained, with its homogeneous and resistant microstructure, due to its formation through a heated medium.*

*Initially, referring to the current state of the art, there are two models of flanging tools present on the market, called a) "conventional flanging tool" and b) "eccentric flanging tool":*

*a) The conventional flanging tools (FIG. 1) are characterized by having a "mordant" for fixing the tubes (1) and a flanging mechanism, the latter, in turn, comprising a body for fixing the "mordant" (2), a threaded spindle (3), which is coupled to the body, a 45-degree conical tip (4) coupled to one end of the spindle and a drive crank (5) at the other end of the spindle. This system is characterized by the concentric alignment (FIG. 2), between the spindle shaft (6) and the conical tip shaft (7). During the flange execution, the contact zone between the tip and the tube is set through the entire surface of the cone.*

*b) The eccentric flanging tools (FIG. 3) are characterized by having a "mordant" for fixing the tubes (8) and a flanging mechanism, the latter, in turn, comprising a body for fixing the "mordant" (9), a threaded spindle (10), which is coupled to the body, a 45-degree conical tip (11) coupled to one end of the spindle and a drive crank (12) at the other end of the spindle. This system is characterized by the eccentric misalignment (FIG. 4) between the spindle shaft (13) and the conical tip shaft (14). During the flange execution, the contact zone between the tip and the tube is set through a linear contact of the cone.*

*Although both promote the final shape of the flange, the current state of the art requires the use of a "mordant" (tailstock) for shaping the flange. The coupling of the tube to the "mordant" and the flange execution takes a long time to execute because, in the case of split type air conditioning applications, it is necessary, for example, to make a total of four flanges per equipment. That is, two flanges per tube, these tubes being necessarily of two different gauges. In addition, due to their conception, both make the cold tube conformation, hardening the flanged material, incurring the risk of cracks in the flange wall.*

*Referring now to the rotating Insert for flanging and widening of metal tubes, called drill for flanging, it allows the execution of the widening and/or flanging of metal tubes through a system of interchangeable inserts. These inserts can be coupled to drills (whether with a chuck or pneumatic coupling) or even to electric screwdrivers.*

*Insert (FIG. 20) can be subdivided into the following parts:*

*a) A cylindrical body (15), for coupling with a drill or a screwdriver, through chuck.*

*b) A flanging tip (16), to properly fit in the metal tube (FIG. 21) and give to its tip (17) a flanged (18) metal tube shape (FIG. 22) at an angle of approximately 45°. The flanging tip (FIG. 23) can contain one stage (19) or (FIG. 24) more stages (20) to make the flange in one or more tubes without the need to change the insert for another one of different size and gauge. For instance, the same tip can have a diameter of 6.35 mm at the end close to its tip and 12.05 mm at the end closest to the cylindrical body. In addition, it (FIG. 25) has a slim shape (21) and rounded corners (22), reducing only two points the contact with the metal tube, thus reducing friction and the amount of burrs.*

*Therefore, the invention differs from the current state of the art in several aspects. First, because the insert does not need a tailstock ("mordant") system to perform the flange in the metal tube. Since the strength required to hold the pipe in the working position is low, the user himself can maintain the positioning of the flanged pipe by hands. Second, as it works through a high rotation system, it is present friction and heating generation in the pipe, facilitating the hot shaping of the flange, without hardening in the region of the tube flange. The absence of hardening in the flange region avoids cracking problems during the tightening of the connection, a problem that is recurrent in the current state of the art. Third, the invention allows the presence of one or more gauges within the same insert, with different diameters, reducing the time of flanges execution, especially in the installation of split type air conditioners, being able of flanging different tube sizes using only one single insert.*

*The main objective of the insert in question is, therefore, to optimize the working time, due to its speed and ease of operation and to bring a higher quality result, considering the heating of the tube when flanged with the insert and its best microstructural result with greater strength.*

*Regarding the applicability of the product, the present invention aims to optimize the process and time of a flange in metal tubes for split type air conditioning systems, but it is not restricted to them. It can also be applied in flange type connections, in tubes for refrigeration applications or even in tube connections for systems that use liquefied petroleum gas.*

What is claimed is:

1. A rotary insert, comprising:

a shank portion;

a stopper portion coupled to the shank portion *such that a T-shape is formed thereby*; and a tip opposite the shank portion, the tip having a base coupled to the stopper portion, the tip extending away from the stopper portion along an axis of symmetry, the tip having a tip end spaced apart from the stopper portion, the tip comprising a first face disposed opposite a second face, the first face and the second face defining a continuous outer edge, the continuous outer edge extending from the tip end to the base; the continuous outer edge intersecting the axis of symmetry at the tip end; the outer edge having a maximum radius relative to the axis of symmetry at the base, the continuous outer edge from the tip end to the base tapering outward relative to the axis of symmetry; from the tip end to the base the tip having at least one stage portion, the continuous outer edge curved *toward the tip end* in the at least one stage portion; and the stopper portion having a stopper radius greater than the maximum radius of the tip,

*wherein,*

*the tip widens an open end portion of a metal tube when (1) the shank portion is inserted into a chuck of a drill or an electric screwdriver, (2) spun via the drill*

*or the electric screwdriver, and (3) inserted into the open end portion of the metal tube while spinning so as to sufficiently heat the open end portion of the metal tube via friction generated between the tip that is spinning and the open end portion of the metal tube and thereby widen the open end portion of the metal tube using a hot process,*

*the drill or the electric screwdriver is not a tailstock, and*

*the tip is insertable into the open end portion of the metal tube up to the stopper portion.*

2. The *rotary* insert of claim 1, *wherein* the continuous outer edge comprising at least two stage portions, in each of the at least two stage portions the continuous outer edge having different curvature.

3. The *rotary* insert of claim 1, *wherein* the *rotary* insert [formed as] *is* a single element.

4. The *rotary* insert of claim 1, *wherein* the *rotary* insert comprising metal.

5. The *rotary* insert of claim 1, *wherein* the *rotary* insert comprising ceramic.

6. The *rotary* insert of claim 1, *wherein* the tip further comprising a flared bottom portion, the flared bottom portion affixed between the stopper portion and the at least one stage portion, at least two edges of the flared bottom portion sloping from the tip to the stopper portion.

7. The *rotary* insert of claim 1, *wherein* the *tip has* rounded edges [being] *which are* equal in diameter.

8. The *rotary* insert of claim 1, *wherein* the at least one stage portion comprising *only* one stage portion.

9. The *rotary* insert of claim 1, *wherein* the at least one stage portion comprising two stage portions.

10. A system, comprising:

a rotary insert comprising:

a shank portion;

a stopper portion coupled to the shank portion *such that a T-shape is formed thereby*; and a tip opposite the shank portion, the tip having a base coupled to the stopper portion, the tip extending away from the stopper portion along an axis of symmetry, the tip having a tip end spaced apart from the stopper portion, the tip comprising a first face disposed opposite a second face, the first face and the second face defining a continuous outer edge, the continuous outer edge extending from the tip end to the base; the continuous outer edge intersecting the axis of symmetry at the tip end; the outer edge having a maximum radius relative to the axis of symmetry at the base, the continuous outer edge from the tip end to the base tapering outward relative to the axis of symmetry; from the tip end to the base the tip having at least one stage portion, the continuous outer edge curved *toward the tip end* in the at least one stage portion; the stopper portion having a stopper radius greater than the maximum radius of the tip; and a drill *or an electric screwdriver having a chuck* engaging the shank portion *to enable the tip to widen an open end portion of a metal tube when (1) the shank portion is inserted into the chuck of the drill or the electric screwdriver, (2) spun via the drill or the electric screwdriver, and (3) inserted into the open end portion of the metal tube while spinning so as to sufficiently heat the open end portion of the metal tube via friction generated between the tip that is spinning and the open end portion of the metal tube and thereby widen the open end portion of the metal tube using a hot process,*

*wherein,*

*the drill or the electric screwdriver is not a tailstock, and*

*the tip is insertable into the open end portion of the metal tube up to the stopper portion.*

11. The system of claim 10, *wherein* the continuous outer edge comprising at least two stage portions, in each of the at least two stage portions the continuous outer edge having different curvature.

12. The system of claim 10, *wherein* the *rotary* insert [formed as] *is* a single element.

13. The system of claim 10, *wherein* the *rotary* insert comprising metal.

14. The system of claim 10, *wherein* the *rotary* insert comprising ceramic.

15. The system of claim 10, further comprising a flared bottom portion, the flared bottom portion affixed between the stopper portion and the tip, at least two edges of the flared bottom portion sloping from the tip to the stopper portion.

16. The system of claim 10, *wherein* the *tip has* rounded edges [being] *which are* equal in diameter.

17. The system of claim 10, *wherein* the at least one stage portion comprising *only* one stage portion.

18. The system of claim 10, *wherein* the at least one stage portion comprising two stage portions.

19. A method for flaring [a] *an open end portion of a metal* tube, the method comprising:

coupling a rotary insert to a *chuck of a* rotary power tool, *wherein the rotary power tool is a drill or an electric screwdriver, wherein the rotary power tool is not a tailstock, wherein* the rotary insert comprising:

*a shank portion;*

*a stopper portion coupled to the shank portion such that a T-shape is formed thereby;* a tip opposite the shank portion, the tip having a base coupled to the stopper portion, the tip extending away from the stopper portion along an axis of symmetry, the tip having a tip end spaced apart from the stopper portion, the tip comprising a first face disposed opposite a second face, the first face and the second face defining a continuous outer edge, the continuous outer edge extending from the tip end to the base; the continuous outer edge intersecting the axis of symmetry at the tip end; the outer edge having a maximum radius relative to the axis of symmetry at the base, the continuous outer edge from the tip end to the base tapering outward relative to the axis of symmetry; from the tip end to the base the tip having at least one stage portion, the continuous outer edge curved *toward the tip end* in the at least one stage portion; and the stopper portion having a stopper radius greater than the maximum radius of the tip;

inserting the *tip of the* rotary insert into *a cavity defined by* an interior surface of [a] *the open end portion of the metal* tube *while the rotary insert is coupled to the chuck of the rotary power tool*; and rotating the rotary insert *by spinning the shank portion via the chuck of the rotary power tool* to cause friction between the tip and the interior surface of the *open end portion of the metal* tube, to increase the diameter of at least a portion of the *metal* tube *including the open end portion*, to create a flare *of the open end portion of the metal tube*, and to increase structural quality of the *metal* tube from heat provided to the *metal* tube *via*

*friction generated between the tip that is spinning and the open end portion of the metal tube using a hot process,*

*wherein,*

*rotating the rotary insert occurs as the tip of the rotary insert is inserted into the cavity defined by the interior surface of the open end portion of the metal tube, and*

*the tip is insertable into the open end portion of the metal tube up to the stopper portion.*

20. A method for swaging [a] *an open end portion of a metal* tube, the method comprising:

coupling a rotary insert [coupled] to a *chuck of a* rotary power tool, *wherein the rotary power tool is a drill or an electric screwdriver, wherein the rotary power tool is not a tailstock, wherein* the rotary insert comprising:

*a shank portion;*

*a stopper portion coupled to the shank portion such that a T-shape is formed thereby;* a tip opposite the shank portion, the tip having a base coupled to the stopper portion, the tip extending away from the stopper portion along an axis of symmetry, the tip having a tip end spaced apart from the stopper portion, the tip comprising a first face disposed opposite a second face, the first face and the second face defining a continuous outer edge, the continuous outer edge extending from the tip end to the base; the continuous outer edge intersecting the axis of symmetry at the tip end; the outer edge having a maximum radius relative to the axis of symmetry at the base, the continuous outer edge from the tip end to the base tapering outward relative to the axis of symmetry; from the tip end to the base the tip having at least one stage portion, the continuous outer edge curved *toward the tip end* in the at least one stage portion; and the stopper portion having a stopper radius greater than the maximum radius of the tip;

inserting the *tip of the* rotary insert into *a cavity defined by* an interior surface of [a] *the open end portion of the metal* tube *while the rotary insert is coupled to the chuck of the rotary power tool*; and rotating the rotary insert *by spinning the shank portion via the chuck of the rotary power tool* to cause friction between the tip and the interior surface of the *open end portion of the metal* tube, to increase the diameter of at least a portion of the *metal* tube *including the open end portion, to create a swage of the open end portion of the metal tube,* and to increase structural quality of the *metal* tube from heat provided to the *metal* tube *via friction generated between the tip that is spinning and the open end portion of the metal tube using a hot process,*

*wherein,*

*rotating the rotary insert occurs as the tip of the rotary insert is inserted into the cavity defined by the interior surface of the open end portion of the metal tube, and*

*the tip is insertable into the open end portion of the metal tube up to the stopper portion.*

*21. The rotary insert of claim 1, wherein the tip widens the open end portion of the metal tube by or including flanging.*

*22. The system of claim 10, wherein the tip is enabled to widen the open end portion of the metal tube by or including flanging.*

*23. The method of claim 19, wherein the tip has only one stage portion.*

*24. The method of claim 19, wherein the tip has two stage portions.*

*25. The method of claim 19, wherein the rotary insert is a single element.*

*26. The method of claim 19, wherein each of the shank, the stopper, and the tip includes metal.*

*27. The method of claim 19, wherein each of the shank, the stopper, and the tip includes ceramic.*

*28. The method of claim 20, wherein the tip has only one stage portion.*

*29. The method of claim 20, wherein the tip has two stage portions.*

*30. The method of claim 20, wherein the rotary insert is a single element.*

*31. The method of claim 20, wherein each of the shank, the stopper, and the tip includes metal.*

*32. The method of claim 20, wherein each of the shank, the stopper, and the tip includes ceramic.*

*33. A rotary insert, comprising:*

*a shank portion;*

*a stopper portion coupled to the shank portion such that a T-shape is formed thereby; and*

*a tip opposite the shank portion, the tip having a base coupled to the stopper portion, the tip extending away from the stopper portion along an axis of symmetry, the tip having a tip end spaced apart from the stopper portion, the tip comprising a first face disposed opposite a second face, the first face and the second face defining a continuous outer edge, the continuous outer edge extending from the tip end to the base; the continuous outer edge intersecting the axis of symmetry at the tip end; the outer edge having a maximum radius relative to the axis of symmetry at the base, the continuous outer edge from the tip end to the base tapering outward relative to the axis of symmetry; from the tip end to the base the tip having at least one stage portion, the continuous outer edge curved toward the tip end in the at least one stage portion; and the stopper portion having a stopper radius greater than the maximum radius of the tip,*

*wherein,*

*the tip widens an open end portion of a metal tube when (1) the shank portion is inserted into a chuck of a drill or an electric screwdriver, (2) spun via the drill or the electric screwdriver, and (3) inserted into the open end portion of the metal tube while spinning so as to sufficiently heat the open end portion of the metal tube via friction generated between the tip that is spinning and the open end portion of the metal tube and thereby widen the open end portion of the metal tube using a hot process,*

*the drill or the electric screwdriver is not a tailstock,*

*the tip is insertable into the open end portion of the metal tube up to the stopper portion,*

*the rotary insert is a single element,*

*the rotary insert comprises metal, and*

*the at least one stage portion comprises only one stage portion.*

*34. The rotary insert of claim 33, wherein the tip widens the open end portion of the metal tube by or including flanging.*

* * * * *